United States Patent [19]

Yamada et al.

[11] Patent Number: 4,798,755
[45] Date of Patent: Jan. 17, 1989

[54] MAGNETIC RECORDING MEDIUM

[75] Inventors: Yasuyuki Yamada; Hajime Miyatsuka, both of Kanagawa, Japan

[73] Assignee: Fuji Photo Film Co., Ltd., Kanagawa, Japan

[21] Appl. No.: 857,872

[22] Filed: May 1, 1986

[30] Foreign Application Priority Data

May 1, 1985 [JP] Japan .................................. 60-92189
May 13, 1985 [JP] Japan .................................. 60-99496

[51] Int. Cl.$^4$ ...................... G11B 5/716; G11B 5/702
[52] U.S. Cl. .................................... 428/141; 427/128;
427/131; 427/132; 428/212; 428/378; 428/329;
428/425.9; 428/522; 428/694; 428/695;
428/900; 252/62.54
[58] Field of Search ............... 428/522, 694, 695, 900,
428/704, 425.9, 212, 220, 141, 328, 329;
427/128, 131, 132; 252/62.54; 360/134–136

[56] References Cited

U.S. PATENT DOCUMENTS

| | | | |
|---|---|---|---|
| 4,070,522 | 1/1978 | Ogasa | 428/336 |
| 4,368,237 | 1/1983 | Yamada | 428/413 |
| 4,520,079 | 5/1983 | Nakajima | 428/900 |
| 4,529,661 | 7/1985 | Ninomiya | 428/900 |
| 4,562,117 | 12/1985 | Kikukawa | 428/407 |
| 4,594,174 | 6/1986 | Nakayama | 428/900 |
| 4,600,521 | 7/1986 | Nakamura | 428/900 |
| 4,612,244 | 9/1986 | Kaneda | 428/900 |
| 4,613,545 | 9/1986 | Chubachi | 428/480 |
| 4,637,959 | 1/1987 | Ninomiya | 428/900 |
| 4,707,410 | 11/1987 | Hata | 428/900 |
| 4,707,411 | 11/1987 | Nakayama | 428/900 |

FOREIGN PATENT DOCUMENTS 57-44227  3/1982  Japan .

Primary Examiner—Ellis P. Robinson
Attorney, Agent, or Firm—Sughrue, Mion, Zinn, Macpeak & Seas

[57] ABSTRACT

A magnetic recording medium is disclosed, comprising a non-magnetic support having provided on one side thereof a magnetic recording layer comprising a binder having dispersed therein fine ferromagnetic particles and on the other side thereof a backing layer, wherein at least one of said magnetic layer and backing layer contains (1) a vinyl chloride resin having $-SO_3M$ (wherein M is Li, Na, or K) groups and epoxy groups, and (2) polyurethane as binders. The medium has reduced output variation and improved running durability.

13 Claims, No Drawings

MAGNETIC RECORDING MEDIUM

FIELD OF THE INVENTION

This invention relates to a magnetic recording medium, and particularly to a binder of a magnetic recording medium, such as video tapes, audio tapes, computer tapes, floppy disks, and the like. More particularly, it relates to a magnetic recording medium which undergoes little variation in output power and has improved running durability.

BACKGROUND OF THE INVENTION

Binders which have been commonly used for magnetic recording media include, for example, vinyl chloride-vinyl acetate resins, alone or as mixtures thereof with one or more polymers selected from cellulose derivatives, acrylic resin (i.e., copolymers of acrylic acid or methacrylic acid and esters thereof), urethane resins, vinylidene chloride copolymers, synthetic rubbers, polyesters, etc., and reactive mixtures comprising the above-described mixture and a polyisocyanate, which are cured by crosslinking.

However, when these conventional binders are used in video tapes, the vinyl chloride-vinyl acetate resin contained in video tapes forms and releases hydrochloric acid, which ultimately causes corrosion of metals of the running system, e.g., guide poles, or a magnetic head of a video deck or ferromagnetic metal particles.

On the other hand, binders not containing vinyl chloride-vinyl acetate resins have a disadvantage of relatively high cost.

In magnetic recording tapes for audio or video devices or computers, the surface of a magnetic recording layer generally has a smooth finish in order to ensure good sensitivity, and, in particular, good output power in the high frequency region. However, such a smooth magnetic recording tape is liable to disorder in winding and rewinding. Use of such a magnetic recording tape causes deterioration of running properties and variation in output and also tends to induce deformation or damage of the tape.

In order to overcome this problem, it has been proposed to provide a backing layer on the surface of a support opposite to the magnetic recording layer. Binders which have conventionally been used for the backing layer include vinyl chloride-vinyl acetate copolymers and the like. Backing layers using these conventional binders, however, adversely affect running durability of the tape due to their poor wear resistance, toughness, etc., thus resulting in an increased coefficient of friction, folding of the tape, and the like. Therefore, improvements in the backing layer has been strongly desired.

In addition, when a backing layer is provided generally for the purpose of improving running characteristics or running durability, it is known that when a magnetic medium is rolled up (particularly if being in a tape shape) or piled up (if being in a sheet shape), surface roughness of the backing layer is transferred to the surface of the magnetic layer to impair surface properties of the magnetic layer, which leads to deterioration in electromagnetic properties of the magnetic medium, especially variation in output power. This is because the surface of the backing layer is made too much rough from the standpoint of running properties, and such a surface roughness is transferred to the magnetic layer surface when the magnetic medium is preserved in storage or allowed to stand in roll form or piles.

As described above, although use of a mixture of a vinyl chloride-vinyl acetate resin as a main binder and other resins as a binder for magnetic recording media, such as video tapes, is economically advantageous, not only such a binder corrodes the running system of a video deck, a permalloy head, or a metal magnetic material, but also the dispersibility of fine ferromagnetic particles in such binder is too poor to ensure high chroma S/N ratios. Moreover, the above-described binder cannot sufficiently satisfy other requirements for video tapes, such as running properties, still life, and the like.

In order to overcome these disadvantages, it is described, e.g., in Japanese Patent Application (OPI) No. 200426/83 (the term "OPI" as herein used means "unexamined published application"), to use a phenoxy resin, a polyurethane elastomer, and a polyisocyanate as a binder. This phenoxy resin, however, has a difficulty in terms of solubility, and therefore it cannot be applied to use with ease and convenience.

SUMMARY OF THE INVENTION

Accordingly, an object of this invention is to provide a binder for magnetic tapes which serves to prevent a video tape recorder (VTR) running system from corroding with rust due to dehydrochlorination, particularly under the circumstances of high temperature and humidity.

Another object of this invention is to provide a binder for magnetic tapes which is capable of sufficiently dispersing fine ferromagnetic particles and provides high chroma S/N ratios.

A further object of this invention is to provide a binder for magnetic tapes which ensures stable tape running to thus provide stable images for an extended period of time, and also exhibits video output stability with less drop outs.

The above objects can be achieved by a magnetic recording medium comprising a non-magnetic support having provided on one side thereof a magnetic layer comprising a binder having dispersed therein fine ferromagnetic particles and on the other side thereof a backing layer, wherein at least one of said magnetic layer and backing layer contains (1) a vinyl chloride resin having $-SO_3M$ groups wherein M is Li, Na, or K, and epoxy groups, and (2) polyurethanes as binders.

DETAILED DESCRIPTION OF THE INVENTION

The vinyl chloride resin which is used in the present invention is a copolymer comprising vinyl chloride and other copolymerizable monomers, such as vinyl acetate, vinylidene chloride, acrylonitrile, styrene, acrylic esters, maleic anhydride, etc., with $-SO_3M$ groups and epoxy groups being bonded thereto. The vinyl chloride resin preferably has a number average molecular weight of from 15,000 to 60,000. The vinyl chloride resin preferably comprises from 80 to 90% by weight of vinyl chloride and from 10 to 20% by weight of at least one copolymerizable monomer. The $-SO_3M$ groups are bonded to the vinyl chloride resin in an amount of from 0.1 to 2.0% by weight, and preferably from 0.2 to 1.5% by weight, and the epoxy groups are bonded to the vinyl chloride resin in an amount of from 0.2 to 10% by weight, and preferably from 0.7 to 5% by weight, both based on the total weight of the vinyl chloride resin.

In the group —SO₃M, M is selected from lithium, sodium, and potassium, with sodium being preferred.

Polyurethanes which can be used as a binder in combination with the vinyl chloride resin may be arbitrarily selected from polymers, either low polymeric or high polymeric, prepared from among isocyanates or from an isocyanate and a compound having a functional group capable of reacting with an isocyanate to form a polymer. Preferred polyurethanes includes polyester polyurethane resins or polyether polyurethane resins which are obtained by reacting (a) a reactive polyester, preferably the one having an average molecular weight of from 600 to 3,000, prepared by reacting an organic dibasic acid, e.g., phthalic acid, adipic acid, a linoleic acid dimer, maleic acid, etc., with a glycol, e.g., ethylene glycol, propylene glycol, butylene glycol, diethylene glycol, etc., or a polyhydric alcohol, e.g., trimethylolpropane, hexanetriol, glycerin, trimethylolethane, pentaerythritol, etc., or a mixture of such reactive polyesters; or a reactive polyether, preferably the one having an average molecular weight of from 600 to 3,000, obtained by polymerization of propylene oxide, ethylene oxide, etc. or a mixture of such reactive polyethers with (b) an isocyanate, e.g., tolylene diisocyanate, 4,4'-diphenylmethane diisocyanate, hexamethylene diisocyanate, etc. These polyester polyurethane resins or polyether polyurethane resins may be used individually or in combination thereof either by mixing or binding. These polyurethane resins preferably have a number average molecular weight of from 20,000 to 100,000.

In addition, polyurethanes that can be used include those containing therein a

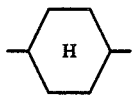

ring and having a skeleton represented by formula (II)

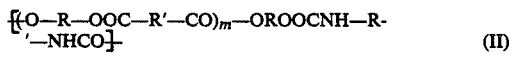

wherein m represents an integer of from 5 to 100; R represents a divalent group derived from an alicyclic or aromatic compound having at least two hydroxyalkyl groups having from 1 to 4 carbon atoms or hydroxyalkoxy groups having from 1 to 4 carbon atoms; R' represents

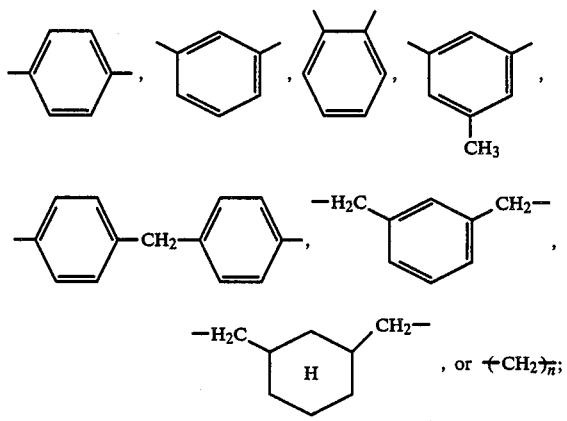

, or $\text{-}(CH_2)_n\text{-}$;

and n represents an integer of from 4 to 6.

These polyurethane resins effectively have a molecular weight of from 5,000 to 500,000, and preferably from 10,000 to 200,000. Additional details regarding such polyurethane resins are described, e.g., in Japanese Patent Application (OPI) No. 122234/80.

A preferred weight proportion of the —SO₃M— and epoxy-containing vinyl chloride resin to the polyurethane is 95/5 to 50/50.

In a preferred embodiment according to the present invention, a low molecular weight polyisocyanate compound (molecular weight: 150 to 2,000) having at least two isocyanate groups is additionally incorporated into the magnetic layer and/or backing layer as a binder to thereby form a three-dimensional network in the layer, which further improves physical strength.

The polyisocyanate compound which can be used in the above-described embodiment includes isocyanates having at least two isocyanate groups and their adducts, for example, aliphatic diisocyanates, aliphatic diisocyanates having a cyclic group, aromatic diisocyanates, naphthalene isocyanates, biphenyl isocyanates, diphenylmethane diisocyanates, triphenylmethane diisocyanates, triisocyanates, tetraisocyanates, etc., and adducts thereof.

Specific examples of the polyisocyanates include isocyanates, such as ethane diisocyanate, butane diisocyanate, hexane diisocyanate, 2,2-dimethylpentane diisocyanate, 2,2,4-trimethylpentane diisocyanate, decane diisocyanate, ω,ω'-diisocyanate-1,3-dimethylbenzoyl, ω,ω'-diisocyanate-1,2-dimethylcyclohexane diisocyanate, ω,ω'-diisocyanate-1,4-diethylbenzoyl, ω,ω'-diisocyanate-1,5-dimethylnaphthalene, ω,ω'-diisocyanate-n-propylbiphenyl, 1,3-phenylene diisocyanate, 1-methylbenzoyl-2,4-diisocyanate, 1,3-dimethylbenzol-2,6-diisocyanate, naphthalene-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzol-2,4,6-triisocyanate, 1,3,5-trimethylbenzol-2,4,6-triisocyanate, diphenylmethane-2,4,4'-triisocyanate, triphenylmethane-4,4',4''-triisocyanate, tolylene diisocyanate, 1,5-naphthylene diisocyanate, etc.; dimers or trimers (adducts) of these isocyanates; and adducts of these isocyanates with di- or trihydric alcohols. The adducts of the isocyanates include an adduct of tolylene diisocyanate with trimethylolpropane, an adduct of 3 mols of tolylene diisocyanate, an adduct of 3 mols of hexamethylene diisocyanate, an adduct of 2 mols of hexamethylene diisocyanate, and adducts formed among the above-recited isocyanates.

The above-described polyisocyanate can be used in an amount of from 5 to 100% by weight based on the total amount of the binder(s) other than the polyisocyanates.

The magnetic layer according to the present invention may also contain polymers, as binder components, other than the above-described vinyl chloride resin and polyurethane, in such an amount that does not adversely affect various magnetic characteristics of the magnetic layer, namely, in an amount of from 1 to 1.5% by weight based on the total amount of the binder.

Such polymers include rubber polymers, such as an acrylonitrile-butadiene copolymer, a styrene-butadiene copolymer, etc., cellulose derivatives, such as cellulose nitrate, cellulose acetate, etc., and the like.

A magnetic layer according to the present invention can be formed by dispersing known fine ferromagnetic particles in the binder using a commonly employed solvent and coating the resulting magnetic dispersion on a commonly employed support in a known coating manner. The dispersion may contain various conventionally employed additives, such as a dispersing agent, a lubricant, an abrasive, an antistatic agent, and the like.

The fine ferromagnetic particles to be used includes fine particles of ferromagnetic iron oxide, ferromagnetic chromium dioxide and ferromagnetic alloys, and the like. Ferromagnetic iron oxide may contain divalent metals, e.g., Cr, Mn, Co, Ni, Zn, etc., in an amount of up to about 10 atom%. Ferromagnetic chromium dioxide to be used is $CrO_2$ which may contain up to 20% by weight of metals, e.g., Na, K, Ti, V, Mn, Fe, Co, Ni, Te, Ru, Sn, Ce, Pb, etc., semi-metals, e.g., P, Sb, Te, etc., or oxides thereof. The fine ferromagnetic particles which can be used in the present invention have a length of from about 0.1 to about 1.0 $\mu$m and an acicular (length/width) ratio of from about 1 to about 15.

Dispersing agents which can be used include fatty acids having from 12 to 18 carbon atoms, e.g., caprylic acid, lauric acid, stearic acid, etc., alkali metal or alkaline earth metal salts of these fatty acids, and esters, amides, etc., of these fatty acids.

Lubricant which can be used includes the above-described fatty acids and, in addition, silicone oil, graphite, molybdenum disulfide, etc.

Abrasive to be used includes fused alumina, silicon carbide, corundum, etc.

Antistatic agents to be used includes fine conductive powders, such as carbon black, and surface active agents, such as saponin.

Organic solvents which can be used in the magnetic coating composition of the present invention include ketones, e.g., acetone, etc., esters, e.g., ethyl acetate, etc., tar solvents, e.g., benzene, etc., chlorinated hydrocarbons, e.g., methylene chloride, etc., and the like.

The weight ratio of the fine ferromagnetic particles to the binder is generally from 100/13 to 100/45, and preferably is from 100/17 to 100/30. The amount of the solvent to be used is from 3.5 to 4.5 times the weight of the ferromagnetic particles. The dispersing agent, the lubricant, the abrasive, the surface active agent as an antistatic agent and the conductive fine powder as an antistatic agent are generally used in amounts of from 0.5 to 20 parts by weight, from 0.2 to 20 parts by weight, from 0.5 to 20 parts by weight, from 0 to 3 parts by weight and from 0.2 to 20 parts by weight, respectively, per 100 parts by weight of the binder.

The ferromagnetic particles, binders and additives are mixed to form a magnetic coating composition, and the composition is coated on a non-magnetic support, such as polyesters, polyolefins, cellulose derivatives, and the like, to form a magnetic layer. The thickness of the magnetic coating is determined depending on the end use, shape (films, tapes, sheets, etc.) and other specifications of the magnetic recording medium, but is usually from 1 to 18 $\mu$m on a dry basis.

The drying temperature and time vary depending on the kind of the solvent used, the amount of the solvent in the coating composition and the desired amount of the solvent remaining in the magnetic layer, but generally ranges from 40° C. to 100° C. The drying is usually carried out by gradually elevating the temperature with the progress of the drying for a period of from about 5 seconds to about 3 minutes.

After the drying, the magnetic recording medium may be wound on a roll, etc., but is usually subjected to calendering, the latter being preferred for improving the S/N ratio. Calendering conditions are optimally selected according to the type of tape to be treated. In general, calendering is carried out under a nip linear pressure of from 80 to 300 kg/cm, and preferably from 100 to 240 kg/cm, at a rate of tape feed of from 30 to 200 m/min., and preferably from 60 to 150 m/min., and at a roll temperature of from 25° to 120° C., and preferably from 45° to 80° C.

The backing layer according to the present invention can contain, as a binder, polymers other than vinyl chloride-vinyl acetate copolymers in addition to the above-described binders of the invention. Such polymers include an acrylonitrile-butadiene copolymer, a cellulose derivative, an ethylene-butadiene copolymer, and the like. These polymers can be used in an amount of from 1 to 20% by weight based on the total amount of the binder.

In the formation of the backing layer, the binder is dispersed in a solvent, such as methyl ethyl ketone, tetrahydrofuran, etc. For the purpose of controlling surface roughness, electrical resistance, etc., of the back surface, various fillers are admixed with the dispersion. Examples of the fillers to be used include carbon black powders, graphite, tungsten disulfide, molybdenum disulfide, boron nitride and other inorganic powders, e.g., $SiO_2$, $CaCO_3$, $Al_2O_3$, $Fe_2O_3$, $TiO_2$, MnO, ZnO, CaO, etc., with carbon black and $CaCO_3$ being particularly preferred. These fillers are generally used at a weight ratio of from 0.7/1 to 4/1, and preferably from 1.1/1 to 3/1 with respect to the binder. The fillers preferably have an average particle size of from 0.01 to 2 $\mu$m.

For the purpose of reducing the coefficient of friction of the backing layer to thereby improve running properties and durability, a fatty acid having 12 or more carbon atoms or its ester compound, silicones, paraffin wax, etc. may be employed as a lubricant. Of these, fatty acids having from 18 to 22 carbon atoms are preferred.

The thickness of the backing layer is generally not more than 3 $\mu$m, and preferably not more than 2 $\mu$m. In order to minimize transfer to the magnetic layer so as not to impair the S/N characteristics of tapes as mentioned above, the most preferred thickness of the backing layer is 1 $\mu$m or less.

It is desirable to reduce surface roughness of the backing layer in order to provide a backing layer whose surface unevenness is not transferred to the magnetic layer. As a result of extensive investigations, the inventors have found it preferable to control the center-line average roughness (Ra), at a cut-off value of 0.08 mm, of the backing layer to be not more than 0.05 $\mu$m, and more preferably not more than 0.024 $\mu$m, when the magnetic layer has Ra of not more than 0.02 $\mu$m.

This invention will now be illustrated in greater detail with reference to the following examples, but it should be understood that they are not intended to limit the present invention. In these examples, all the parts are by weight.

EXAMPLE 1

(a) Ferromagnetic metal fine powder Fe:Ni     100

-continued

| | (parts) |
|---|---|
| 89:11 by weight; BET specific surface area: 50 m²/g) | |
| (b) Vinyl chloride resin (vinyl chloride = 87 wt %, vinyl acetate = 13 wt %, number average molecular weight: $2.6 \times 10^4$), to which an epoxy group and a —SO₃Na group had been bonded in amounts shown in Table 1 | 12* |
| (c) Thermoplastic polyurethane resin (prepared) from polybutylene adipate of 2200 in molecular weight and diphenylmethane diisocyanate; number average molecular weight: 35,000; Tg: −26° C.) | 10 |
| (d) Behenic acid/butyl stearate (1:1 by weight) | 2 |
| (e) α-Al₂O₃ (mean particle size: 0.4 μm) | 7 |
| (f) Tetrahydrofuran/methyl ethyl ketone/cyclohexane (1:1:1 by weight) | 320 |

*parts of the vinyl chloride resin

The above components (a) to (f) were kneaded and dispersed for 10 hours, and 7 parts of a triisocyanate compound (an ethyl acetate solution containing 75 wt% of a 3:1 adduct of tolylene diisocyanate and trimethylolpropane having a molecular weight of 656; "Desmodule L-75" produced by Bayer A.G.) was added thereto. The mixture was subjected to high rate shear dispersion for one hour to prepare a magnetic coating composition.

The resulting coating composition was coated on a 14 μm thick polyethylene terephthalate film to a dry thickness of 5 μm. After drying, the film was supercalendered and then slit to a width of ½ inch to produce a video metal tape. The resulting tape samples were designated as Samples 1 to 18. Each of the samples was evaluated for various characteristics and corrosive action on a permalloy head in accordance with the following test methods. The results obtained are shown in Table 2.

For comparison, Sample 19 was prepared in the same manner as for Samples 1 to 18, except for replacing the component (b) with VMCH (vinyl chloride/vinyl acetate/maleic acid=86/13/1 by weight).

TEST METHOD (i) Video Output:

An output at a signal of 4 MHz was measured, as compared with a reference tape (VHS standard tape SAG produced by Fuji Photo Film Co., Ltd.) as 0 dB. The measurement was effected on a VHS type video tape recorder "NV-6600" manufactured by Matsushita Electric Industries, Ltd.

(ii) S/N Ratio:

An S/N ratio at a frequency in the range of from 10 KHz to 4 MHz. Visual correction was conducted. The measurement was effected on "NV-6600".

(iii) Video Running Properties:

A sample tape was run on 50 commercially available VHS type video tape recorders at conditions of 25° C., 50% RH or 40° C., 80% RH to observe jitter and skew. The running properties were evaluated according to the following grades:

A: No jitter or skew was observed.
B: Jitter or skew sometimes occurred, but are acceptable in practical use.
C: Jitter or skew occurred with fairly high frequency and are not acceptable in practical use.

(iv) Increase of DO (Drop Outs)

An increase of DO was measured simultaneously with the measurement of running properties.
A: D.O. increased by less than 10/min.
B: D.O. increased by less than 20/min.
C: D.O. increased by less than 30/min.
D: D.O. increased by 30/min. or more.

(v) Still Life (Durability at Still Mode):

A time (min.) until a reproduced still image developed significant defects in it and the RF output decreased to one third or less. The measurement was effected on "NV-6600".

(vi) Corrosion of Permalloy Head:

A same tape was left to stand in contact with a permalloy head for one week in an atmosphere of 60° C. and 85% RH, and corrosion of the head was observed under a microscope at 200 magnifications.

TABLE 1

| Sample No. | Epoxy Group Content (wt. %)* | —SO₃Na Group Content (wt. %)* | Remark |
|---|---|---|---|
| 1 | 0.2 | 0.5 | Invention |
| 2 | 0.7 | 0.5 | " |
| 3 | 1.2 | 0.5 | " |
| 4 | 1.7 | 0.5 | " |
| 5 | 2.2 | 0.5 | " |
| 6 | 2.7 | 0.5 | " |
| 7 | 3.5 | 0.7 | " |
| 8 | 4.5 | 0.7 | " |
| 9 | 6.5 | 0.7 | " |
| 10 | 8.5 | 0.7 | " |
| 11 | 1.7 | 0 | Comparison |
| 12 | 1.7 | 0.2 | Invention |
| 13 | 1.7 | 0.6 | " |
| 14 | 1.7 | 0.8 | " |
| 15 | 1.7 | 1.5 | " |
| 16 | 0 | 0.2 | Comparison |
| 17 | 0 | 0.8 | " |
| 18 | 0 | 0 | " |
| 19 | 0 | 0 | " |

Note:
*wt % based on the vinyl chloride resin.

TABLE 2

| Sample No. | Video Output (dB) | S/N Ratio (dB) | Video Running Properties | Still Life (min) | Corrosion of Head | D.O. Increase |
|---|---|---|---|---|---|---|
| 1 | 0.3 | 0.2 | A | >120 | none | A |
| 2 | 0.4 | 0.3 | A | " | " | A |
| 3 | 0.7 | 0.5 | A | " | " | A |
| 4 | 0.9 | 0.6 | A | " | " | A |
| 5 | 0.4 | 0.4 | A | " | " | A |
| 6 | 0.2 | 0.2 | A | " | " | B |
| 7 | 0.2 | 0.2 | A | " | " | A |
| 8 | 0.3 | 0.3 | A | " | " | A |
| 9 | 0.3 | 0.2 | A | " | " | A |
| 10 | 0.2 | 0.3 | A | " | " | A |
| 11 | −0.1 | −0.5 | A | " | " | B |
| 12 | 0 | 0.5 | A | " | " | B |
| 13 | 0.4 | 0.5 | A | " | " | A |
| 14 | 0.4 | 0.4 | A | " | " | A |
| 15 | 0.1 | 0.5 | A | " | " | A |
| 16 | 0 | −0.1 | B | 50 | observed | C |
| 17 | 0 | −0.2 | B | 20 | " | C |
| 18 | −0.4 | −0.1 | B | 10 | " | C |
| 19 | 0 | −0.1 | A | 75 | " | D |

As can be seen from Tables 1 and 2 above, Samples 11, 18 and 19 wherein vinyl chloride resins containing no —SO₃Na group were used are inferior in video output and S/N ratio, and Samples 16, 17, 18 and 19 wherein vinyl chloride resins containing no epoxy group were used show corrosive action on a permalloy head and have low S/N ratios. Further, samples 16, 17 and 18 undergo a significant increase of DO. To the contrary, samples according to the present invention are excellent in various characteristics and cause no corrosion of the permalloy head.

Thus, video tapes in accordance with the present invention makes it possible to effectively prevent corrosion of the VTR running system and to provide images excellent in various video characteristics.

EXAMPLE 2

| | |
|---|---|
| (a) Vinyl chloride resin (vinyl chloride = 87 wt %, vinyl acetate = 13 wt %; number average molecular weight: $2.6 \times 10^4$), to which an epoxy group and a $-SO_3Na$ group had been bonded in amounts shown in Table 3 | 30* (parts) |
| (b) Thermoplastic polyurethane resin (butylene adipate/diphenylmethane diisocyanate; number average molecular weight: $3.5 \times 10^4$; Tg: $-26°$ C.) | 10 |
| (c) Polyisocyanate ("Coronate" produced by Nippon Polyurethane Industry (Co., Ltd.) | 25 |
| (d) Calcium carbonate fine powder (average particle size: 0.07 μm) | 150 |
| (e) Methyl ethyl ketone | 650 |

*parts of the vinyl chloride resin

The above components (a), (b), (d) and (e) were thoroughly kneaded in a ball mill, and the component (c) was added thereto to prepare a coating composition. The composition was coated on a back side of a magnetic recording tape having a magnetic recording layer prepared according to Example 1 above to form a backing layer having a dry thickness of from 0.8 to 1.2 μm on the side opposite to the magnetic recording layer. The resulting samples were designated as Samples A-1 to A-18.

For comparison, Sample A-19 was prepared in the same manner as described above except for replacing the component (a) with VMCH (vinyl chloride/vinyl acetate/maleic acid=86/13/1 by weight).

Each of Samples A-1 to A-19 was evaluated for running durability in accordance with the following test methods.

TEST METHODS 1

A tape sample was run on a VHS type video tape recorder for 100 passes, and the lead-in tension ($T_1$) and lead-out tension ($T_2$) at the rotary cylinder were measured for each of the virgin tape and the tape after 100 passes to evaluate running durability.

Further, output variation after 100 passes was also determined.

TEST METHOD 2

A sample tape was run on a VHS type video tape recorder, and the degree of wear (scratches) of the backing layer surface and the degree of damage of the tape (folds and waving) after 100 passes were observed. In the evaluation of wear of backing layer, "very slight" means 0 to 4 scratches and "many" means 10 or more scratches. In the evaluation of tape damages, "very slight" means 0 to 4 tape damages and "many" means 10 or more tape damages.

The results of these tests are shown in Table 4.

TABLE 3

| Sample No. | Epoxy Group Content (wt %)* | $-SO_3Na$ Group Content (wt %)* | Remark |
|---|---|---|---|
| 1 | 0.2 | 0.5 | Invention |
| 2 | 0.7 | 0.5 | " |
| 3 | 1.2 | 0.5 | " |
| 4 | 1.7 | 0.5 | " |
| 5 | 2.2 | 0.5 | " |
| 6 | 2.7 | 0.5 | " |
| 7 | 3.5 | 0.7 | " |
| 8 | 4.5 | 0.7 | " |
| 9 | 6.5 | 0.7 | " |
| 10 | 8.5 | 0.7 | " |
| 11 | 1.7 | 0 | Comparison |
| 12 | 1.7 | 0.2 | Invention |
| 13 | 1.7 | 0.6 | " |
| 14 | 1.7 | 0.8 | " |
| 15 | 1.7 | 1.5 | " |
| 16 | 0 | 0.2 | Comparison |
| 17 | 0 | 0.8 | " |
| 18 | 0 | 0 | " |
| 19 | 0 | 0 | " |

Note:
*wt % based on the vinyl chloride resin.

TABLE 4

| Sample No. | A-1 | A-2 | A-3 | A-4 | A-5 | A-6 | A-7 | A-8 | A-9 | A-10 |
|---|---|---|---|---|---|---|---|---|---|---|
| Output Variation After 100 Passes (dB) | 0.4 | 0.1 | 0.2 | 0.1 | 0.2 | 0.4 | 0.2 | 0.2 | 0.2 | 0.2 |
| $T_2/T_1$ (g) of Virgin Tape | 75/35 | 68/34 | 86/39 | 69/35 | 68/35 | 79/35 | 80/35 | 68/34 | 67/35 | 75/35 |
| $T_2/T_1$ (g) After 100 Passes | 71/35 | 65/34 | 84/39 | 69/35 | 65/35 | 77/35 | 79/35 | 69/35 | 66/34 | 72/35 |
| Wear of Backing Layer (scratches) | very slight | very slight | very slight | very slight | very slight | very slight | very slight | very slight | very slight | very slight |
| Damage of Tape (folds, and waving) | very slight | none | none | none | none | very slight | none | slight | none | none |

| Sample No. | A-11 | A-12 | A-13 | A-14 | A-15 | A-16 | A-17 | A-18 | A-19 |
|---|---|---|---|---|---|---|---|---|---|
| Output Variation After 100 Passes (dB) | 1.1 | 0.3 | 0.2 | 0.1 | 0.4 | 1.2 | 1.2 | 1.1 | 0.9 |
| $T_2/T_1$ (g) of Virgin Tape | 108/39 | 76/37 | 67/35 | 80/38 | 77/33 | 106/38 | 110/37 | 115/34 | 101/39 |
| $T_2/T_1$ (g) After 100 Passes | 105/39 | 74/37 | 65/35 | 75/38 | 76/33 | 101/38 | 107/37 | 110/34 | 100/39 |
| Wear of Backing Layer (scratches) | many | very slight | very slight | very slight | very slight | many | many | many | many |
| Damage of Tape (folds, and waving) | many | very slight | none | none | very slight | many | many | many | many |

EXAMPLE 3

| | |
|---|---|
| (a) Vinyl chloride resin (vinyl chloride = 80 wt %, vinylidene chloride = 20 wt %; number average molecular weight: 2.6 × 10⁴), to which an epoxy group and a —SO₃Na group had been bonded in amounts shown in Table 3 | 30* (parts) |
| (b) Thermoplastic polyurethane resin (the same as used in Example 2) | 20 |
| (c) Polyisocyanate (the same as used in Example 2) | 45 |
| (d) Carbon black (particle size: 1.7 μm) | 190 |
| Carbon black (particle size: 280 μm) | 50 |
| (e) Methyl ethyl ketone | 960 |

*parts of the vinyl chloride resin

A magnetic tape was produced in the same manner as described in Example 2 except for using the above composition as a backing layer coating composition. The resulting samples were designated as Samples B-1 to B-18.

Each of the samples was subjected to the same tests as in Example 2, and the results obtained are shown in Table 5 below.

TABLE 5

| Sample No. | B-1 | B-2 | B-3 | B-4 | B-5 | B-6 | B-7 | B-8 | B-9 |
|---|---|---|---|---|---|---|---|---|---|
| Output Variation After 100 Passes (dB) | 0.4 | 0.2 | 0.2 | 0.2 | 0.2 | 0.3 | 0.1 | 0.2 | 0.1 |
| $T_2/T_1$ (g) of Virgin Tape | 77.35 | 86/38 | 68/34 | 68/35 | 67/35 | 75/35 | 77/33 | 67/34 | 87/37 |
| $T_2/T_1$ (g) After 100 Passes | 75/33 | 83/38 | 65/34 | 66/35 | 63/35 | 70/35 | 74/33 | 65/34 | 85/37 |
| Wear of Backing Layer (scratches) | very slight | very slight | very slight | very slight | very slight | very slight | very slight | very slight | very slight |
| Damage of Tape (folds, and waving) | very slight | none | none | none | none | very slight | none | none | none |

| Sample No. | B-10 | B-11 | B-12 | B-13 | B-14 | B-15 | B-16 | B-17 | B-18 |
|---|---|---|---|---|---|---|---|---|---|
| Output Variation After 100 Passes (dB) | 0.1 | 1.0 | 0.4 | 0.1 | 0.2 | 0.4 | 1.1 | 1.2 | 1.0 |
| $T_2/T_1$ (g) of Virgin Tape | 75/35 | 80/37 | 79/35 | 67/35 | 86/39 | 76/37 | 102/34 | 108/35 | 112/35 |
| $T_2/T_1$ (g) After 100 Passes | 71/34 | 75/37 | 76/35 | 67/35 | 84/39 | 76/37 | 100/34 | 107/35 | 106/35 |
| Wear of Backing Layer (scratches) | very slight | many | very slight | very slight | very slight | very slight | many | many | many |
| Damage of Tape (folds, and waving) | none | many | very slight | none | none | very slight | many | many | many |

As is apparent from Tables 4 and 5 above, magnetic tapes having a backing layer in which the binders according to the present invention are used exhibit excellent running durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided on one side thereof a magnetic layer comprising a binder having dispersed therein fine ferromagnetic particles and on the other side thereof a backing layer, wherein both said magnetic layer and said backing layer contain (1) a vinyl chloride resin having —SO₃M groups, wherein M is selected from Li, Na, and K, and epoxy groups, and (2) polyurethane as binders, wherein said vinyl chloride resin contains from 0.1 to 2.0% by weight —SO₃M groups, and from 0.2 to 10% by weight epoxy groups, based on the total weight of the resin; and wherein the weight of the fine ferromagnetic particles to the binder is in the range of from 100/13 to 100/45.

2. A magnetic recording medium as in claim 1, wherein said vinyl chloride resin comprises from 80 to 90% by weight vinyl chloride and from 10 to 20% by weight of at least one copolymerizable monomer.

3. A magnetic recording medium as in claim 1, wherein said polyurethane has a number average molecular weight of from 20,000 to 100,000.

4. A magnetic recording medium as in claim 1, wherein said vinyl chloride resin contains from 0.2 to 1.5% by weight —SO₃M groups, and from 0.7 to 5% by weight epoxy groups, based on the total weight of the resin.

5. A magnetic recording medium as in claim 1, wherein said —SO₃M groups are —SO₃Na groups.

6. A magnetic recording medium as in claim 1, wherein the weight ratio of the —SO₃M— and epoxy-containing vinyl chloride resin to the polyurethane is from 95/5 to 50/50.

7. A magnetic recording medium as in claim 1, wherein at least one of said magnetic layer and said backing layer further contains a polyisocyanate.

8. A magnetic recording medium as in claim 7, wherein said polyisocyanate has an average molecular weight of from 150 to 2,000.

9. A magnetic recording medium as in claim 7, wherein said polyisocyanate is present in an amount of from 5 to 100% by weight based on the total weight of the binder forming said layer.

10. A magnetic recording medium as in claim 1, wherein said backing layer has a center-line average roughness (Ra), at a cut-off value of 0.08 mm, of not more than 0.05 μm, and that of said magnetic layer is not more than 0.02 μm.

11. A magnetic recording medium as in claim 10, wherein said blocking layer has a center-line average roughness (Ra), at a cut-off value of 0.08 mm, of not more than 0.024 μm, and that of said magnetic layer is not more than 0.02 μm.

12. A magnetic recording medium as in claim 1, wherein said vinyl chloride resin has a number average molecular weight of from 15,000 to 60,000.

13. A magnetic recording medium as in claim 12, wherein said polyurethane has a number average molecular weight of from 20,000 to 100,000.

* * * * *